W. S. TEMPLE.
VEHICLE TIRE CONSTRUCTION.
APPLICATION FILED FEB. 12, 1915.

1,194,322.

Patented Aug. 8, 1916.

William S. Temple, Inventor.

Witnesses

UNITED STATES PATENT OFFICE.

WILLIAM S. TEMPLE, OF MOUNT VERNON, OHIO.

VEHICLE-TIRE CONSTRUCTION.

1,194,322.  Specification of Letters Patent.  Patented Aug. 8, 1916.

Application filed February 12, 1915. Serial No. 7,703.

*To all whom it may concern:*

Be it known that I, WILLIAM S. TEMPLE, a citizen of the United States of America, residing at Mount Vernon, in the county of Knox and State of Ohio, have invented certain new and useful Improvements in Vehicle-Tire Construction, of which the following is a specification.

My invention relates to vehicle tire construction and has to do with the provision of a reinforcement for the shoes of vehicle tires, which reinforcement is of such a nature that the vehicle tire, to which it is applied is not only protected against normal punctures but is protected as well against blow-outs which are most commonly prevalent adjacent the base or bead of the shoe.

From one aspect, my invention consists in the use of a plurality of layers of metallic disks which are placed in the body of the tire shoe so that the disks of superposed layers are eccentric in relation to each other and conjointly form an impenetrable metallic armor ready in all positions of the tire to prevent the penetration of pointed objects to the inner tube normally inclosed in the shoe. In the preferred form, the disks utilized are independent of each other and are molded into the tire structure.

The invention assumes another aspect in that it contemplates the provision of a supplemental attachment, this supplemental attachment having its reinforcing structure limited to that portion of the shoe which is normally subjected to puncture. This supplemental formation is capable of use independently of a reinforced shoe and is also capable of use in conjunction with a reinforced shoe so as to practically double the protection against normal punctures without detracting from the protection and reinforcement against blow-outs in the weaker portions of the tire.

Coincident to the novel feature outlined, one of the important features of my invention relates to the structure of the disks which are used in assemblage to produce a reinforcing armor. The disks are peculiarly formed to insure against accidental displacement, this being effected without any increase of weight or bulk. In addition, this peculiar formation results in an increased efficiency in the function of excluding pointed objects from access to the inner tube, The preferred embodiment of my invention is shown in the accompanying drawings in which—

Figure 1:
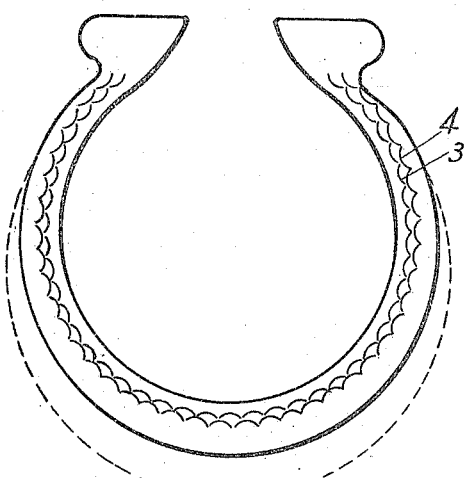
Figure 2:
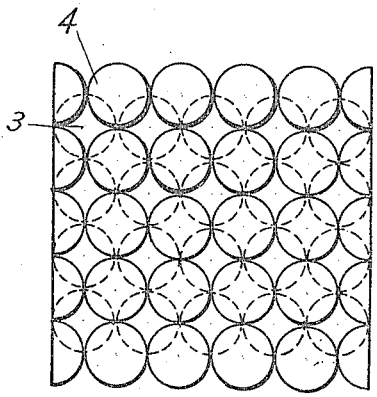
Figure 3:
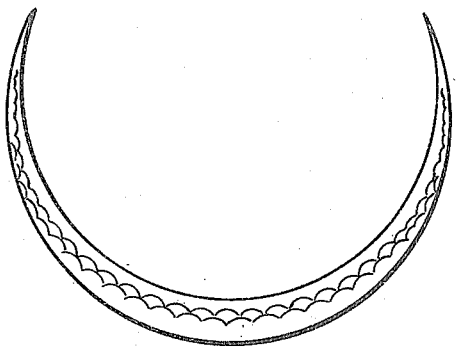
Figure 4:

Figure 1 is a transverse section of a shoe embodying the characteristics of my invention and having applied thereto a dotted line representation of the supplemental attachment of my improvement. Fig. 2 is a plan view showing the relative disposition of the superposed layers of disks used in my improvement. Fig. 3 is a transverse section taken through the supplemental attachment of my invention. Fig. 4 is a detail view showing one of the disks used in assemblage to form the reinforcing structure of my tire.

In the drawings, the disks 1 are shown to comprise a sheet metal element convexly curved on one side and having its other side of a concave nature. The convex surface of each disk is provided with protrusions or roughened portions 2 which serve because of their embedded relation in the tire structure to preclude accidental shifting of these disks. In application to the shoe structure, the disks are preferably disposed in a series of rows extending longitudinally entirely around the shoe and extending transversely well down into the bead of the shoe. The importance of this extension of the disks transversely down into the body of the shoe will become apparent when it is appreciated that most blow-outs occur adjacent the bead of the shoe and this structure practically precludes such blow-outs by the reinforcement provided. By reference to Fig. 1 it will appear that the disks are disposed with their concave faces outward and by reference to Fig. 2 it will appear that the superposed layers 3 and 4 are so arranged that their disks are relatively eccentric whereby the spaces between the disks of one layer are closed and covered by the disks of the other layer.

In relation to the puncture-preventing function of the shoe reinforcement, it will appear that a pointed object passing into the shoe must strike the concave side of one of the disks. The concave surface of this disk acts, by its very formation, to deflect the point of the sharp object inwardly toward the center of the disk instead of permitting it to slide outwardly and pass over the edge of such disk. The almost inevitable result is that any pointed object striking the disk will be deflected toward the center thereof, and if such disk is in the outermost layer, the pointed object will never penetrate to the next adjacent layer. If the pointed object passes between the disks of the outermost layer it will be caught by a disk of the next adjacent layer and will surely be directed toward the center of such disk.

The supplemental portion of my invention, shown in Fig. 3, is peculiarly advantageous in conjunction with the structure just described in that it make possible the doubling of the protection against punctures without in any way detracting from the normal reinforcement against blow-outs. However, this supplemental attachment is efficient in itself in application to any normal tire to receive and exclude pointed objects from access to the inner tube of the tire.

The independent relation of the disks makes possible the ready repair of any area of the tire which would, to a large extent, be precluded if these disks were mounted upon a fabric structure and thus connected together.

Having thus described my invention, what I claim is:

1. In a vehicle tire structure, the combination of a shoe, and an armor carried by said shoe comprising sheet metal disks with concave sides facing outward.

2. In a vehicle tire structure, the combination of a shoe, and an armor carried by said shoe element comprising superposed layers of sheet metal disks staggered to offer an imperforate armor, said disks having concave surfaces facing outward.

3. A reinforcing element for vehicle tire structure in the form of a disk having one side roughened and the other side concave.

4. A reinforcing element for vehicle tire structure in the form of a concavo-convex disk having its convex side roughened.

In testimony whereof I hereby affix my signature in presence of two witnesses.

WILLIAM S. TEMPLE.

Witnesses:
BANNER M. ALLEN,
D. B. TUTTLE.